(12) United States Patent
Lius et al.

(10) Patent No.: US 12,117,631 B2
(45) Date of Patent: Oct. 15, 2024

(54) OPTICAL SENSING DEVICE

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 291 days.

(21) Appl. No.: 17/542,687

(22) Filed: Dec. 6, 2021

(65) Prior Publication Data
US 2022/0221634 A1 Jul. 14, 2022

(30) Foreign Application Priority Data
Jan. 12, 2021 (CN) .......................... 202110035618.1

(51) Int. Cl.
| | | |
|---|---|---|
| G01J 1/04 | (2006.01) | |
| G01J 3/02 | (2006.01) | |
| G01J 3/28 | (2006.01) | |
| G02B 5/20 | (2006.01) | |
| G06F 3/042 | (2006.01) | |

(52) U.S. Cl.
CPC ............ *G02B 5/208* (2013.01); *G01J 1/0437* (2013.01); *G01J 3/0208* (2013.01); *G01J 3/2803* (2013.01); *G06F 3/0421* (2013.01); *G01J 2003/2806* (2013.01)

(58) Field of Classification Search
CPC ...... G02B 5/208; G01J 1/0437; G01J 3/0208; G01J 3/2803; G01J 2003/2806; G06F 3/0421; G06F 3/04182; G06F 3/0412; G06V 40/13; H01L 27/14678; H01L 27/14621; H01L 27/14643; H10K 39/32
See application file for complete search history.

(56) References Cited

U.S. PATENT DOCUMENTS

| | | | |
|---|---|---|---|
| 2017/0337413 A1* | 11/2017 | Bhat | ............... G06V 40/1347 |
| 2018/0067212 A1* | 3/2018 | Wilson | ................... H04M 1/02 |
| 2019/0303639 A1* | 10/2019 | He | ...................... G09G 3/3208 |
| 2020/0019746 A1 | 1/2020 | Fan et al. | |
| 2020/0293740 A1* | 9/2020 | Yao | ................... H01L 27/14627 |
| 2021/0217784 A1 | 7/2021 | Li et al. | |
| 2021/0279439 A1* | 9/2021 | Li | ....................... G06V 40/1318 |
| 2022/0180653 A1* | 6/2022 | Bouthinon | .......... H04M 1/0266 |

FOREIGN PATENT DOCUMENTS

| | | |
|---|---|---|
| WO | 2020/073900 A1 | 4/2020 |
| WO | 2020/155801 A1 | 8/2020 |

OTHER PUBLICATIONS

Extended European Search Report dated Jun. 1, 2022, issued in application No. EP 21216211.9.

\* cited by examiner

*Primary Examiner* — David P Porta
*Assistant Examiner* — Mamadou Faye
(74) *Attorney, Agent, or Firm* — McClure, Qualey & Rodack, LLP

(57) ABSTRACT

An optical sensing device is provided. The optical sensing device includes a thin-film transistor, a sensing unit driven by the thin-film transistor, and a filter. Light to be detected passes through the filter before being collected by the sensing unit. The filter reduces the light intensity of the light to be detected in the near-infrared light wavelength band.

17 Claims, 10 Drawing Sheets

OPTICAL SENSING DEVICE

CROSS REFERENCE TO RELATED APPLICATIONS

This application claims priority of China Patent Application No. 202110035618.1, filed on Jan. 12, 2021, the entirety of which are incorporated by reference herein.

BACKGROUND

Technical Field

The present disclosure relates to an optical sensing device, and in particular it relates to an optical sensing device arranged with a filter capable of filtering a specific wavelength band.

Description of the Related Art

Taking a touch display as an example, when a finger touches a panel, an internal light-emitting element emits a light source. After the light source reaches the finger, reflected light is generated and enters the optical sensing device to convert the received light signal into an electrical signal. However, near-infrared light (750 nm to 1,100 nm) in the ambient environment can penetrate the finger and the display, causing noise in the optical sensing device.

Silicon-based PIN photodiodes in the optical sensing device have much higher responses to the near-infrared light wavelength band than the visible-light wavelength band. That is, the near-infrared light in the environment has a high degree of influence on the photodiodes.

SUMMARY

In accordance with one embodiment of the present disclosure, an optical sensing device is provided. The optical sensing device includes a thin-film transistor, a sensing unit driven by the thin-film transistor, and a filter, wherein light to be detected passes through the filter before being collected by the sensing unit, and the filter reduces the light intensity of the light to be detected in the near-infrared light wavelength band.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
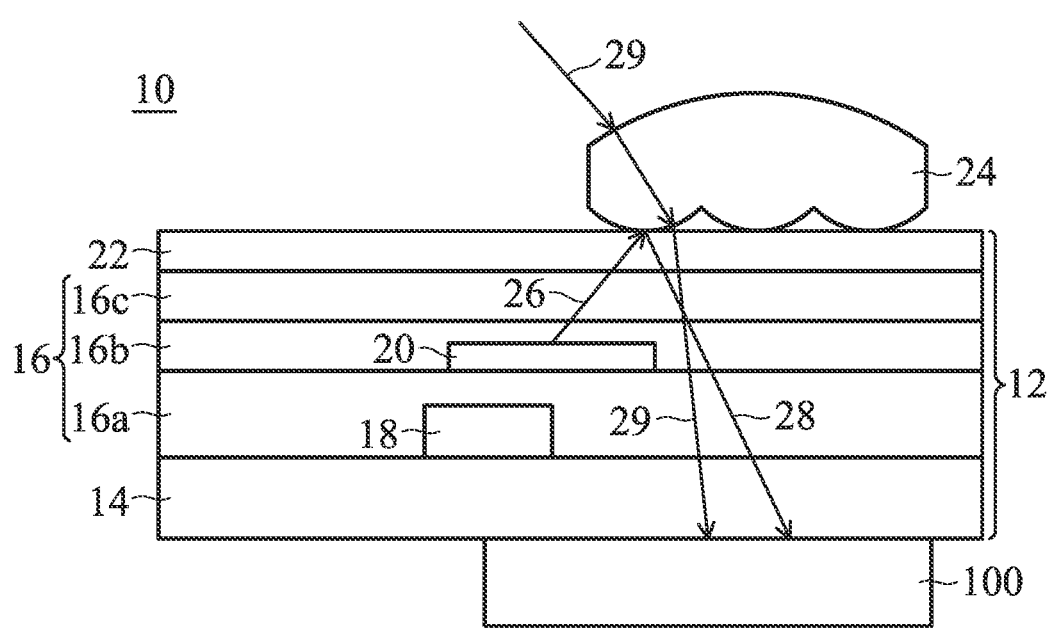
FIG. 1 is a schematic cross-sectional view of an electronic device in accordance with one embodiment of the present disclosure.

Various embodiments or examples are provided in the following description to implement different features of the present disclosure. The elements and arrangement described in the following specific examples are merely provided for introducing the present disclosure and serve as examples without limiting the scope of the present disclosure. For example, when a first component is referred to as "on a second component", it may directly contact the second component, or there may be other components in between, and the first component and the second component do not come in direct contact with one another.

It should be understood that additional operations may be provided before, during, and/or after the described method. In accordance with some embodiments, some of the stages (or steps) described below may be replaced or omitted.

In this specification, spatial terms may be used, such as "below", "lower", "above", "higher" and similar terms, for briefly describing the relationship between an element relative to another element in the figures. Besides the directions illustrated in the figures, the devices may be used or operated in different directions. When the device is turned to different directions (such as rotated 45 degrees or other directions), the spatially related adjectives used in it will also be interpreted according to the turned position.

Herein, the terms "about", "around" and "substantially" typically mean a value is in a range of +/−20% of a stated value, typically a range of +/−10% of the stated value, typically a range of +/−5% of the stated value, typically a range of +/−3% of the stated value, typically a range of +/−2% of the stated value, typically a range of +/−1% of the stated value, or typically a range of +/−0.5% of the stated value. The stated value of the present disclosure is an approximate value. Namely, the meaning of "about", "around" and "substantially" still exists even if there is no specific description of "about", "around" and "substantially".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section from another element, component, region, layer, portion or section from another element, component, region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

Referring to FIG. 1, in accordance with one embodiment of the present disclosure, an electronic device 10 is provided. FIG. 1 is a schematic cross-sectional view of the electronic device 10.

In the embodiment shown in FIG. 1, the electronic device 10 includes a panel 12 and an optical sensing device 100. The panel 12 is disposed on the optical sensing device 100. The panel 12 includes a substrate 14, a plurality of insulating layers 16, a circuit 18, a light-emitting element 20, and a glass cover 22. The substrate 14 may include any suitable hard or soft substrate material. The plurality of insulating layers 16 include, for example, a first insulating layer 16a, a second insulating layer 16b, and a third insulating layer 16c, which are disposed on the substrate 14, but the present disclosure is not limited thereto. In some embodiments, the circuit 18 is disposed on the substrate 14 in the first insulating layer 16a. The circuit 18 may include a circuit for driving the light-emitting element 20. For example, the circuit 18 may be a 7T2C-type circuit structure composed of seven thin-film transistors and two capacitors, but the present disclosure is not limited thereto. In some embodiments, the light-emitting element 20 is disposed on the substrate 14 in the second insulating layer 16b. The light-emitting element 20 may include a light-emitting diode (LED), for example, an organic light-emitting diode (OLED), an inorganic light-emitting diode (OLED), mini LED, micro LED, or quantum dot light-emitting diode (QLED), but the present disclosure is not limited thereto. In some embodiments, the circuit 18 is electrically connected to the light-emitting element 20. The optical sensing device 100 may include an optical device that converts various received optical signals into electrical signals through internal light-sensitive elements, for example, infrared light sensors, ultraviolet light sensors, image sensors, or depth sensors, but the present disclosure is not limited thereto.

In FIG. 1, when a finger 24 touches the glass cover 22, the light-emitting element 20 emits light 26. After the light 26 reaches the finger 24, reflected light 28 is generated and enters the optical sensing device 100. At this time, the optical sensing device 100 receives the reflected light 28 from the finger 24 and converts the optical signal into an electrical signal. In some embodiments, in the environment outside the electronic device, near-infrared light 29 passes through the finger 24 and the panel 12 and enters the optical sensing device 100. In other words, the light to be detected received by the optical sensing device 100 includes, in addition to the reflected light 28 of the target, the near-infrared light 29 in the environment. The aforementioned near-infrared light 29 may be, for example, near-infrared light having a wavelength between about 750 nanometers and about 1,100 nanometers.

Figure 2:
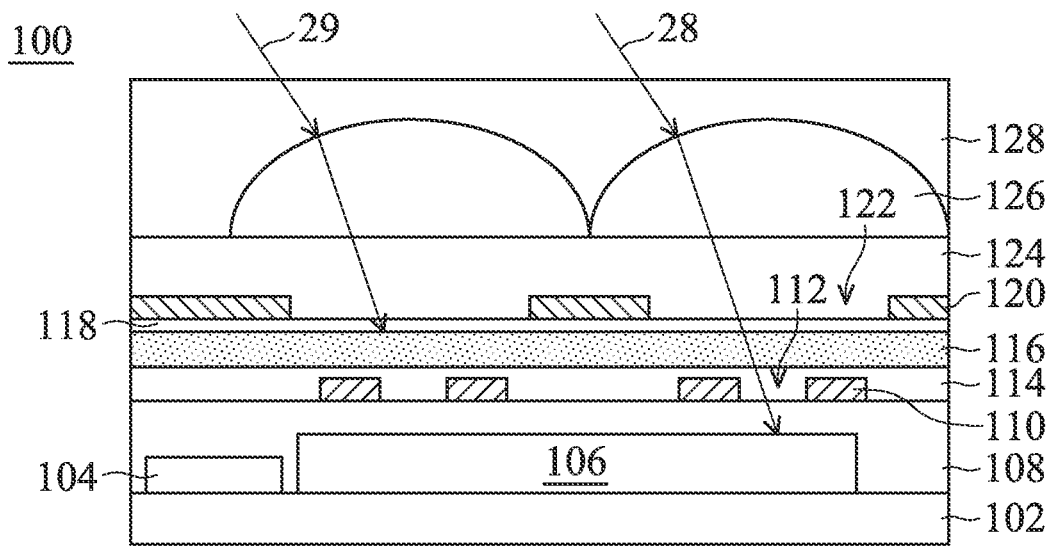
FIG. 2 is a schematic cross-sectional view of an optical sensing device in accordance with one embodiment of the present disclosure.

Referring to FIG. 2, in accordance with one embodiment of the present disclosure, the detailed structure of the optical sensing device 100 is further illustrated. FIG. 2 is a schematic cross-sectional view of the optical sensing device 100.

In the embodiment shown in FIG. 2, the optical sensing device 100 includes a substrate 102, a thin-film transistor (TFT) 104, a sensing unit 106, a first insulating layer 108, a first light-shielding layer 110, first pinholes 112, a second insulating layer 114, a filter 116, a third insulating layer 118, a second light-shielding layer 120, second pinholes 122, a fourth insulating layer 124, a light-focusing means 126, and a fifth insulating layer 128. The substrate 102 may include any suitable hard or soft substrate material. The thin-film transistor 104 is disposed on the substrate 102. The sensing unit 106 is disposed on the substrate 102 and driven by the thin-film transistor 104. The aforementioned so-called "the sensing unit 106 is driven by the thin-film transistor 104" means that an electrical connection is formed between the sensing unit 106 and the thin-film transistor 104. The sensing unit 106 may include light-to-electricity photosensitive elements, for example, silicon-based photodiodes. The aforementioned so-called "silicon-based" refers to amorphous silicon (a-Si), amorphous selenium (a-Se), or amorphous silicon germanium (a-SiGe) materials. The sensing unit 106 may include inorganic PIN photodiodes or organic photodiodes (OPDs).

In FIG. 2, the thin-film transistor 104 and the sensing unit 106 are disposed on the substrate 102 and are in contact with the substrate 102, but the present disclosure is not limited thereto. In some embodiments, the thin-film transistor 104 and the sensing unit 106 are disposed on the substrate 102 and are not in contact with the substrate 102. In some embodiments, a direct electrical connection is formed between the thin-film transistor 104 and the sensing unit 106. In some embodiments, an indirect electrical connection is formed between the thin-film transistor 104 and the sensing unit 106. The first insulating layer 108 is disposed on the substrate 102 and covers the thin-film transistor 104 and the sensing unit 106. The first insulating layer 108 may include any suitable insulating material, such as silicon oxide, silicon nitride, or silicon oxynitride. The first insulating layer 108 may be a single layer or a composite layer. The first light-shielding layer 110 is disposed on the first insulating layer 108. The first light-shielding layer 110 may be composed of light-shielding materials such as black photoresist or metal, but the present disclosure is not limited thereto. The first pinholes 112 are formed in the first light-shielding layer 110. The first pinholes 112 refer to the pinhole areas formed by patterning the first light-shielding layer 110. The second insulating layer 114 is disposed on the first insulating layer 108, covers the first light-shielding layer 110, and fills the first pinholes 112. The second insulating layer 114 may include any suitable insulating material, such as silicon oxide, silicon nitride, or silicon oxynitride. The filter 116 is disposed on the second insulating layer 114. The filter 116 may be composed of a single layer or multiple layers of organic or inorganic materials. The aforementioned organic materials may include colored organic materials, for example, dyes or pigments. At least one dye or pigment can absorb or reflect light with a certain wavelength.

In FIG. 2, the filter 116 is a single organic material layer. The filter 116 is a structure that filters light. That is, a structure that can filter light in a specific wavelength band, for example, it may filter near-infrared light with a wavelength between about 750 nanometers and about 1,100 nanometers. According to some embodiments, the structure for filtering light in a specific wavelength band may be a structure that absorbs and/or reflects light, so that after the light to be detected passes through the structure, the intensity of the light to be detected in the specific wavelength band decreases. In other words, the filter 116 may include at least one material that can reflect and/or absorb light in a specific wavelength band. Due to the configuration of the filter 116, the light to be detected passes through the filter 116 before being collected by the sensing unit 106, and the transmittance of the light to be detected in the near-infrared light wavelength band can be reduced accordingly. In addition, the aforementioned so-called "light to be detected" refers to the light that all enters the optical sensing device 100. For example, as shown in FIG. 1, the reflected light 28 and the near-infrared light 29 are light entering the optical sensing device 100. Therefore, the reflected light 28 and the near-infrared light 29 may be the so-called "light to be detected" in the present disclosure.

As shown in FIG. 2, in some embodiments, the response of the sensing unit 106, for example, in the near-infrared light wavelength band is higher than that in the visible-light wavelength band (for example, visible light with a wavelength of 400 nm to 750 nm). If the near-infrared light 29 in the environment is not filtered out, the chance of noise generated in the sensing unit 106 may be increased, affecting the quality of, for example, fingerprint recognition. In one embodiment, the light to be detected (for example, including the reflected light 28 and the near-infrared light 29) passes through the filter 116 before entering the sensing unit 106. The near-infrared light 29 in the environment can be filtered by the filter 116 to reduce the light intensity of the near-infrared light 29 or make the light intensity of the near-infrared light 29 approach zero, which can reduce the chance of noise generated in the sensing unit 106. In other words, the light intensity of the near-infrared light 29 after passing through the filter 116 is less than the light intensity of the near-infrared light 29 before passing through the filter 116. In some embodiments, the near-infrared light 29 is incident on the optical sensing device 100 and enters the sensing unit 106 after passing through the filter 116. The light intensity detected by the sensing unit 106 is less than the light intensity of the near-infrared light 29 before entering the optical sensing device 100. It is worth noting that before passing through the filter 116, the near-infrared light 29 can pass through other layers disposed on the filter 116 (for example, the second light-shielding layer 120). In some embodiments, the light intensity detected by the sensing unit 106 may be 50% or less than 50% of the light intensity of the near-infrared light 29 before it is incident on the optical sensing device 100, but the present disclosure is not limited thereto. In the present disclosure, the filter 116 capable of filtering near-infrared (NIR) light is disposed above the sensing unit 106, which can reduce the chance of near-infrared light reaching the sensing unit 106 to generate noise, and improve the sensing quality of the sensing unit 106. It is worth noting that the filter 116 can filter the near-infrared light wavelength band is one embodiment of the present disclosure. In other embodiments, the filter 116 can filter other wavelength bands, as long as it can improve the sensing quality of the sensing unit 106.

The filter 116 is disposed on the second insulating layer 114 by, for example, coating or attaching. The third insulating layer 118 is disposed on the filter 116. The third insulating layer 118 may include any suitable insulating material, such as silicon oxide, silicon nitride, or silicon oxynitride. The second light-shielding layer 120 is disposed on the third insulating layer 118. The second light-shielding layer 120 may be composed of light-shielding materials such as black photoresist or metal, but the present disclosure is not limited thereto. The second pinholes 122 are formed in the second light-shielding layer 120. The second pinholes 122 refer to the pinhole areas formed by patterning the second light-shielding layer 120. The fourth insulating layer 124 is disposed on the third insulating layer 118, covers the second light-shielding layer 120, and fills the second pinholes 122. The fourth insulating layer 124 may include any suitable insulating material, such as silicon oxide, silicon nitride, or silicon oxynitride. The light-focusing means 126 is disposed on the fourth insulating layer 124. The light-focusing means 126 refers to an element that can focus light on the sensing unit 106, for example, a microlens or a collimator, etc. In FIG. 2, the light-focusing means 126 used is a microlens. The light to be detected passes through the light-focusing means 126 before filtering. In other words, the light to be detected can pass through the light-focusing means 126 before passing through the filter 116. The light to be detected focused by the light-focusing means 126 passes through the second pinholes 122 before being filtered. In other words, the light to be detected can pass through the second pinholes 122 before passing through the filter 116. The aforementioned so-called "focusing" refers to concentrating the relatively divergent light to focus the light on the sensing unit 106. The filter 116 is disposed between the light-focusing means 126 and the first pinholes 112. The fifth insulating layer 128 is disposed on the fourth insulating layer 124, covers the light-focusing means 126, and can be used as a protective layer of the light-focusing means 126. The fifth insulating layer 128 may include any suitable insulating material, such as silicon oxide, silicon nitride, or silicon oxynitride. It is worth noting that, in the embodiment shown in FIG. 2, the projection of the filter 116 on the substrate 102 and the projection of the sensing unit 106 on the substrate 102 overlap, and the filter 116 is disposed between the first light-shielding layer 110 and the second light-shielding layer 120. According to some embodiments, the first pinholes 112 and the second pinholes 122 are arranged corresponding to the sensing unit 106.

Figure 3A:
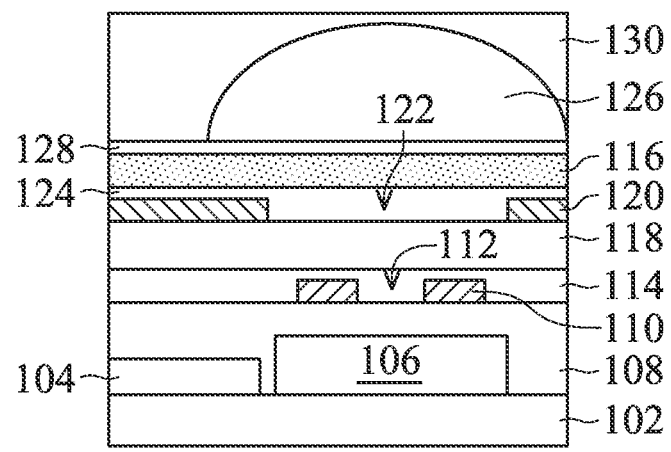
FIG. 3A is a schematic cross-sectional view of an optical sensing device in accordance with one embodiment of the present disclosure.

Referring to FIG. 3A, in accordance with one embodiment of the present disclosure, an optical sensing device 100 is provided. FIG. 3A is a schematic cross-sectional view of the optical sensing device 100.

In the embodiment shown in FIG. 3A, the optical sensing device 100 includes a substrate 102, a thin-film transistor 104, a sensing unit 106, a first insulating layer 108, a first light-shielding layer 110, a first pinhole 112, a second insulating layer 114, a third insulating layer 118, a second light-shielding layer 120, a second pinhole 122, a fourth insulating layer 124, a filter 116, a fifth insulating layer 128, a light-focusing means 126, and a sixth insulating layer 130. The structures and materials of the above-mentioned components and layers are similar to those of the embodiment shown in FIG. 2, and will not be repeated here. The following will describe the relative positional relationship between the components. As shown in FIG. 3A, the thin-film transistor 104 is disposed on the substrate 102. The sensing unit 106 is disposed on the substrate 102 and driven by the thin-film transistor 104. The first insulating layer 108 is disposed on the substrate 102 to cover the thin-film transistor 104 and the sensing unit 106. The first light-shielding layer 110 is disposed on the first insulating layer 108. The first pinhole 112 is formed in the first light-shielding layer 110. The second insulating layer 114 is disposed on the first insulating layer 108, covers the first light-shielding layer 110, and fills the first pinhole 112. The third insulating layer 118 is disposed on the second insulating layer 114. The second light-shielding layer 120 is disposed on the third insulating layer 118. The second pinhole 122 is formed in the second light-shielding layer 120. The fourth insulating layer 124 is disposed on the third insulating layer 118, covers the second light-shielding layer 120, and fills the second pinhole 122. The filter 116 is disposed on the fourth insulating layer 124. For example, according to some embodiments, the fourth insulating layer 124 may be in contact with the third insulating layer 118. In FIG. 3A, the filter 116 may be composed of a single layer or multiple layers of organic material, but the present disclosure is not limited thereto. The fifth insulating layer 128 is disposed on the filter 116. The light-focusing means 126 is disposed on the fifth insulating layer 128. In FIG. 3A, the light-focusing means 126 used is a microlens, but the present disclosure is not limited thereto. The sixth insulating layer 130 is disposed on the fifth insulating layer 128, covers the light-focusing means 126, and can be used as a protective layer of the light-focusing means 126. It is worth noting that, in the embodiment shown in FIG. 3A, the projection of the filter 116 on the substrate 102 and the projection of the sensing unit 106 on the substrate 102 overlap, and the filter 116 is disposed above the first light-shielding layer 110 and the second light-shielding layer 120.

Figure 3B:
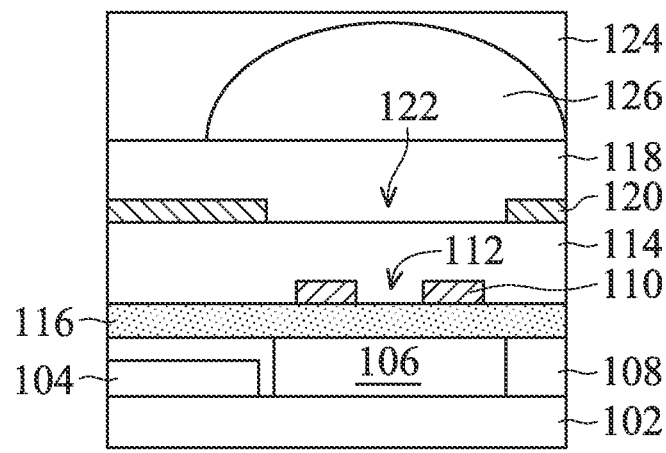
FIG. 3B is a schematic cross-sectional view of an optical sensing device in accordance with one embodiment of the present disclosure.

Referring to FIG. 3B, in accordance with one embodiment of the present disclosure, an optical sensing device 100 is provided. FIG. 3B is a schematic cross-sectional view of the optical sensing device 100.

In the embodiment shown in FIG. 3B, the optical sensing device 100 includes a substrate 102, a thin-film transistor 104, a sensing unit 106, a first insulating layer 108, a filter 116, a first light-shielding layer 110, a first pinhole 112, a second insulating layer 114, a second light-shielding layer 120, a second pinhole 122, a third insulating layer 118, a light-focusing means 126, and a fourth insulating layer 124. The structures and materials of the above-mentioned components and layers are similar to those of the embodiment shown in FIG. 2, and will not be repeated here. The following will describe the relative positional relationship between the components. As shown in FIG. 3B, the thin-film transistor 104 is disposed on the substrate 102. The sensing unit 106 is disposed on the substrate 102 and driven by the thin-film transistor 104. The first insulating layer 108 is disposed on the substrate 102 and surrounds the thin-film transistor 104 and the sensing unit 106. For example, as shown in FIG. 3B, part of the first insulating layer 108 is located between the thin-film transistor 104 and the sensing unit 106. The filter 116 is disposed on the first insulating layer 108 and is in contact with the sensing unit 106. In FIG. 3B, the filter 116 is a single organic material layer, but the disclosure is not limited thereto. The first light-shielding layer 110 is disposed on the filter 116. The first pinhole 112 is formed in the first light-shielding layer 110. The second insulating layer 114 is disposed on the filter 116, covers the first light-shielding layer 110, and fills the first pinhole 112.

The second light-shielding layer 120 is disposed on the second insulating layer 114. The second pinhole 122 is formed in the second light-shielding layer 120. The third insulating layer 118 is disposed on the second insulating layer 114, covers the second light-shielding layer 120, and fills the second pinhole 122. The light-focusing means 126 is disposed on the third insulating layer 118. In FIG. 3B, the light-focusing means 126 used is a microlens, but the present disclosure is not limited thereto. The fourth insulating layer 124 is disposed on the third insulating layer 118 to cover the light-focusing means 126 and can serve as a protective layer for the light-focusing means 126. In some embodiments, a single or multiple insulating layers (not shown) can also be added between the filter 116 and the sensing unit 106. It is worth noting that, in the embodiment shown in FIG. 3B, the projection of the filter 116 on the substrate 102 and the projection of the sensing unit 106 on the substrate 102 overlap, and the filter 116 is disposed under the first light-shielding layer 110 and the second light-shielding layer 120. In some embodiments, the filter 116 is disposed between the first light-shielding layer 110 and the sensing unit 106.

Figure 4:
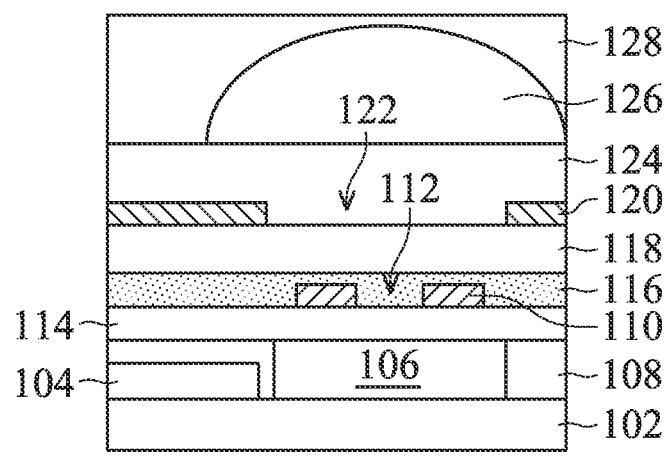
FIG. 4 is a schematic cross-sectional view of an optical sensing device in accordance with one embodiment of the present disclosure.

Referring to FIG. 4, in accordance with one embodiment of the present disclosure, an optical sensing device 100 is provided. FIG. 4 is a schematic cross-sectional view of the optical sensing device 100.

In the embodiment shown in FIG. 4, the optical sensing device 100 includes a substrate 102, a thin-film transistor 104, a sensing unit 106, a first insulating layer 108, a second insulating layer 114, a first light-shielding layer 110, a first pinhole 112, a filter 116, a third insulating layer 118, a second light-shielding layer 120, a second pinhole 122, a fourth insulating layer 124, a light-focusing means 126, and a fifth insulating layer 128. The structures and materials of the above-mentioned components and layers are similar to those of the embodiment shown in FIG. 2, and will not be repeated here. The following will describe the relative positional relationship between the components. As shown in FIG. 4, the thin-film transistor 104 is disposed on the substrate 102. The sensing unit 106 is disposed on the substrate 102 and driven by the thin-film transistor 104. The first insulating layer 108 is disposed on the substrate 102 and surrounds the thin-film transistor 104 and the sensing unit 106. The second insulating layer 114 is disposed on the first insulating layer 108 and is in contact with the sensing unit 106. The first light-shielding layer 110 is disposed on the second insulating layer 114. The first pinhole 112 is formed in the first light-shielding layer 110. The filter 116 is disposed on the second insulating layer 114, covers the first light-shielding layer 110, and fills the first pinhole 112. In FIG. 4, the filter 116 is a single layer of organic material, but the present disclosure is not limited thereto. The third insulating layer 118 is disposed on the filter 116. The second light-shielding layer 120 is disposed on the third insulating layer 118. The second pinhole 122 is formed in the second light-shielding layer 120. The fourth insulating layer 124 is disposed on the third insulating layer 118, covers the second light-shielding layer 120, and fills the second pinhole 122. The light-focusing means 126 is disposed on the fourth insulating layer 124. In FIG. 4, the light-focusing means 126 used is a microlens, but the present disclosure is not limited thereto. The fifth insulating layer 128 is disposed on the fourth insulating layer 124, covers the light-focusing means 126, and can be used as a protective layer of the light-focusing means 126. It is worth noting that, in the embodiment shown in FIG. 4, the projection of the filter 116 on the substrate 102 and the projection of the sensing unit 106 on the substrate 102 overlap, and the filter 116 is disposed on the second insulating layer 114, covers the first light-shielding layer 110, and fills the first pinhole 112.

Figure 5:
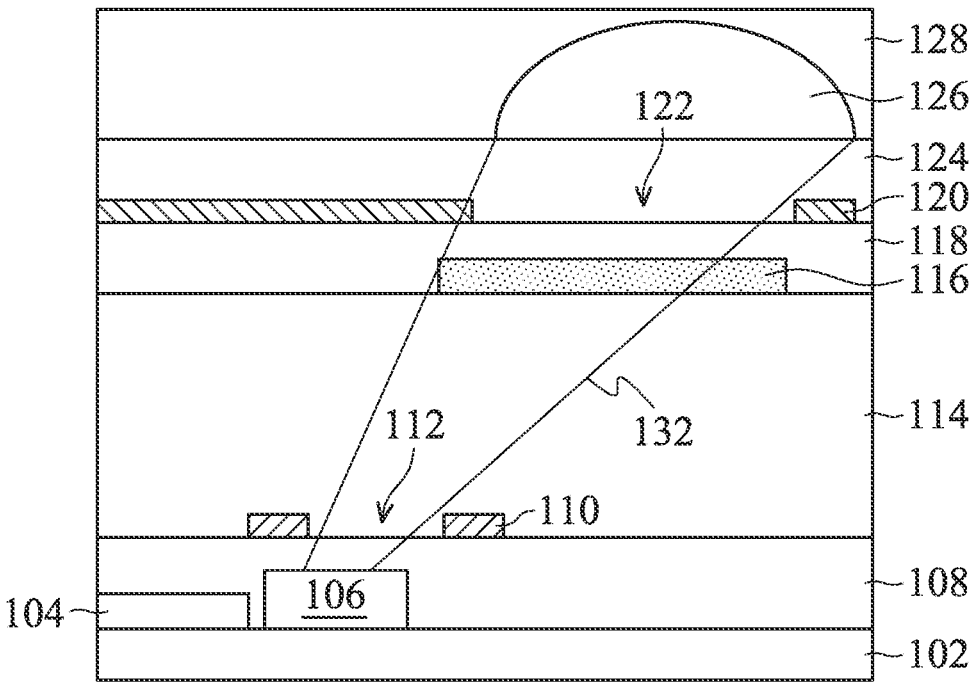
FIG. 5 is a schematic cross-sectional view of an optical sensing device in accordance with one embodiment of the present disclosure.

Referring to FIG. 5, in accordance with one embodiment of the present disclosure, an optical sensing device 100 is provided. FIG. 5 is a schematic cross-sectional view of the optical sensing device 100.

In the embodiment shown in FIG. 5, the structures and materials of each component and each layer of the optical sensing device 100 are similar to those of the embodiment shown in FIG. 2, and will not be repeated here. The following will describe the relative positional relationship between the components. As shown in FIG. 5, the thin-film transistor 104 is disposed on the substrate 102. The sensing unit 106 is disposed on the substrate 102 and driven by the thin-film transistor 104. The first insulating layer 108 is disposed on the substrate 102 and covers the thin-film transistor 104 and the sensing unit 106. The first light-shielding layer 110 is disposed on the first insulating layer 108. The first pinhole 112 is formed in the first light-shielding layer 110. The position of the first pinhole 112 is offset by a specific distance relative to the position of the sensing unit 106. That is, the first pinhole 112 partially overlaps the sensing unit 106 in the normal direction of the substrate 102. The second insulating layer 114 is disposed on the first insulating layer 108, covers the first light-shielding layer 110, and fills the first pinhole 112. The filter 116 is disposed on the second insulating layer 114. The position of the filter 116 is offset by a specific distance relative to the position of the sensing unit 106. In FIG. 5, the filter 116 is a single organic material layer, but the disclosure is not limited thereto. The third insulating layer 118 is disposed on the filter 116. The second light-shielding layer 120 is disposed on the third insulating layer 118. The second pinhole 122 is formed in the second light-shielding layer 120. The position of the second pinhole 122 is offset by a specific distance relative to the position of the sensing unit 106. The fourth insulating layer 124 is disposed on the third insulating layer 118, covers the second light-shielding layer 120, and fills the second pinhole 122. The light-focusing means 126 is disposed on the fourth insulating layer 124. The position of the light-focusing means 126 is offset by a specific distance relative to the position of the sensing unit 106. In FIG. 5, the light-focusing means 126 used is a microlens, but the present disclosure is not limited thereto. The fifth insulating layer 128 is disposed on the fourth insulating layer 124, covers the light-focusing means 126, and can be used as a protective layer of the light-focusing means 126. It is worth noting that, in the embodiment shown in FIG. 5, the filter 116 is disposed between the first light-shielding layer 110 and the second light-shielding layer 120, but the projection of the filter 116 on the substrate 102 and the projection of the sensing unit 106 on the substrate 102 do not overlap. Compared with the embodiment shown in FIG. 2, in FIG. 5, the positions of the first pinhole 112, the filter 116, the second pinhole 122, and the light-focusing means 126 are offset by different specific distances relative to the position of the sensing unit 106. The structure is suitable for the detection of incident light with a large angle, such as incident light with an incident angle greater than 90 degrees, but the present disclosure is not limited thereto. Since the positions of the first pinhole 112, the filter 116, the second pinhole 122, and the light-focusing means 126 are all on the same light path 132 detected with a large angle, the structure can achieve the effect of reducing the light intensity of the near-infrared light wavelength band in the light to be detected.

Figure 6:
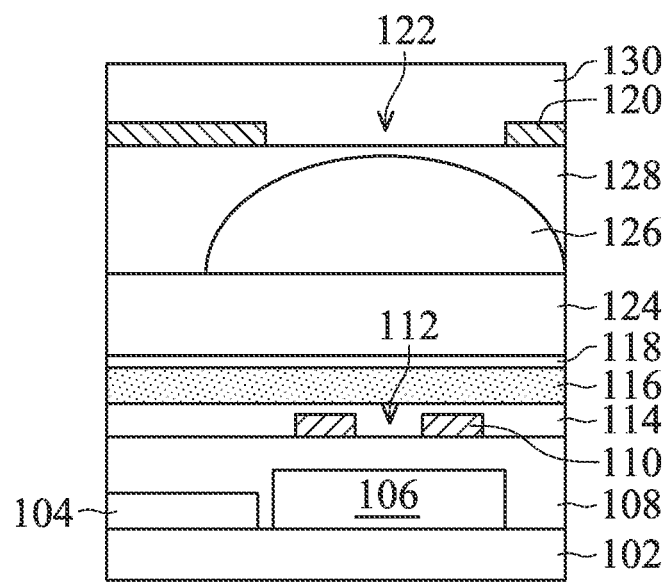
FIG. 6 is a schematic cross-sectional view of an optical sensing device in accordance with one embodiment of the present disclosure.

Referring to FIG. 6, in accordance with one embodiment of the present disclosure, an optical sensing device 100 is provided. FIG. 6 is a schematic cross-sectional view of the optical sensing device 100.

In the embodiment shown in FIG. 6, the optical sensing device 100 includes a substrate 102, a thin-film transistor 104, a sensing unit 106, a first insulating layer 108, a first light-shielding layer 110, a first pinhole 112, a second insulating layer 114, a filter 116, a third insulating layer 118, a fourth insulating layer 124, a light-focusing means 126, a fifth insulating layer 128, a second light-shielding layer 120, a second pinhole 122, and a sixth insulating layer 130. The structures and materials of the above-mentioned components and layers are similar to those of the embodiment shown in FIG. 2, and will not be repeated here. The following will describe the relative positional relationship between the components. As shown in FIG. 6, the thin-film transistor 104 is disposed on the substrate 102. The sensing unit 106 is disposed on the substrate 102 and driven by the thin-film transistor 104. The first insulating layer 108 is disposed on the substrate 102 and covers the thin-film transistor 104 and the sensing unit 106. The first light-shielding layer 110 is disposed on the first insulating layer 108. The first pinhole 112 is formed in the first light-shielding layer 110. The second insulating layer 114 is disposed on the first insulating layer 108, covers the first light-shielding layer 110, and fills the first pinhole 112. The filter 116 is disposed on the second insulating layer 114. In FIG. 6, the filter 116 is a single organic material layer, but the disclosure is not limited thereto. The third insulating layer 118 is disposed on the filter 116. The fourth insulating layer 124 is disposed on the third insulating layer 118. The light-focusing means 126 is disposed on the fourth insulating layer 124. In FIG. 6, the light-focusing means 126 used is a microlens, but the present disclosure is not limited thereto. The fifth insulating layer 128 is disposed on the fourth insulating layer 124, covers the light-focusing means 126, and can be used as a protective layer of the light-focusing means 126. The second light-shielding layer 120 is disposed on the fifth insulating layer 128. The second pinhole 122 is formed in the second light-shielding layer 120. The sixth insulating layer 130 is disposed on the fifth insulating layer 128, covers the second light-shielding layer 120, and fills the second pinhole 122. It is worth noting that, in the embodiment shown in FIG. 6, the projection of the filter 116 on the substrate 102 and the projection of the sensing unit 106 on the substrate 102 overlap, and the second light-shielding layer 120 (including the second pinhole 122) is disposed above the light-focusing means 126.

Figure 7A:
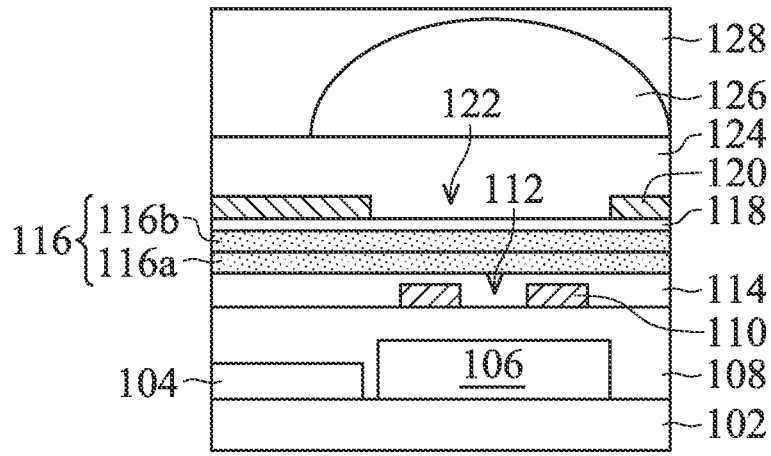
FIG. 7A is a schematic cross-sectional view of an optical sensing device in accordance with one embodiment of the present disclosure.

Referring to FIG. 7A, in accordance with one embodiment of the present disclosure, an optical sensing device 100 is provided. FIG. 7A is a schematic cross-sectional view of the optical sensing device 100.

In the embodiment shown in FIG. 7A, the optical sensing device 100 includes a substrate 102, a thin-film transistor 104, a sensing unit 106, a first insulating layer 108, a first light-shielding layer 110, a first pinhole 112, a second insulating layer 114, a filter 116, a third insulating layer 118, a second light-shielding layer 120, a second pinhole 122, a fourth insulating layer 124, a light-focusing means 126, and a fifth insulating layer 128. The structures and materials of the above-mentioned components and layers are similar to the embodiment shown in FIG. 2 (except for the configuration of the filter 116), and will not be repeated here. The following will describe the relative positional relationship between the components and the configuration of the filter 116. As shown in FIG. 7A, the thin-film transistor 104 is disposed on the substrate 102. The sensing unit 106 is disposed on the substrate 102 and driven by the thin-film transistor 104. The first insulating layer 108 is disposed on the substrate 102 and covers the thin-film transistor 104 and the sensing unit 106. The first light-shielding layer 110 is disposed on the first insulating layer 108. The first pinhole 112 is formed in the first light-shielding layer 110. The second insulating layer 114 is disposed on the first insulating layer 108, covers the first light-shielding layer 110, and fills the first pinhole 112. The filter 116 includes a first filter 116a and a second filter 116b, which are sequentially disposed on the second insulating layer 114.

In FIG. 7A, the filter 116 includes multiple organic material layers, for example, the filter 116 includes dual organic material layers, but the present disclosure is not limited thereto. In some embodiments, the first filter 116a and the second filter 116b can respectively filter light of different wavelength bands, for example, the first filter 116a can filter light with wavelengths ranging from about 700 nanometers to about 900 nanometers. The second filter 116b can filter near-infrared light with wavelengths ranging from about 900 nanometers to about 1,100 nanometers, or the opposite, the first filter 116a can filter near-infrared light with wavelengths ranging from about 900 nanometers to about 1,100 nanometers, and the second filter 116b can filter light with wavelengths ranging from about 700 nanometers to about 900 nanometers. Due to the light-filtering addition effect of the first filter 116a and the second filter 116b, the total wavelength range of light that the filter 116 can filter is between about 700 nanometers to about 1,100 nanometers. Since the filter 116 is a combination of multiple organic material layers, each layer of the filter only needs to be filled with a single dye or pigment to achieve the effect of light-filtering addition, which can reduce the cost, or can provide the options of multiple light-filtering wavelength bands. In some embodiments, the filter 116 can be designed to filter the visible-light wavelength band and the infrared-light wavelength band. For example, if the sensing unit 106 needs to sense the green-light wavelength band, the filter 116 can be designed as a combination of multiple organic material layers, and each layer is designed to have different light-filtering wavelength bands, so that, after the light to be detected passes through the filter 116, the light intensity of the non-green-light wavelength band is reduced, thereby improving the sensing quality of the sensing unit 106.

The third insulating layer 118 is disposed on the filter 116. The second light-shielding layer 120 is disposed on the third insulating layer 118. The second pinhole 122 is formed in the second light-shielding layer 120. The fourth insulating layer 124 is disposed on the third insulating layer 118, covers the second light-shielding layer 120, and fills the second pinhole 122. The light-focusing means 126 is disposed on the fourth insulating layer 124. In FIG. 7A, the light-focusing means 126 used is a microlens, but the present disclosure is not limited thereto. The fifth insulating layer 128 is disposed on the fourth insulating layer 124, covers the light-focusing means 126, and can be used as a protective layer of the light-focusing means 126. It is worth noting that, in the embodiment shown in FIG. 7A, the projection of the filter 116 on the substrate 102 and the projection of the sensing unit 106 on the substrate 102 overlap, and the filter 116 (including the first filter 116a and the second filter 116b, which are in contact with each other) is disposed between the first light-shielding layer 110 and the second light-shielding layer 120.

Figure 7B:
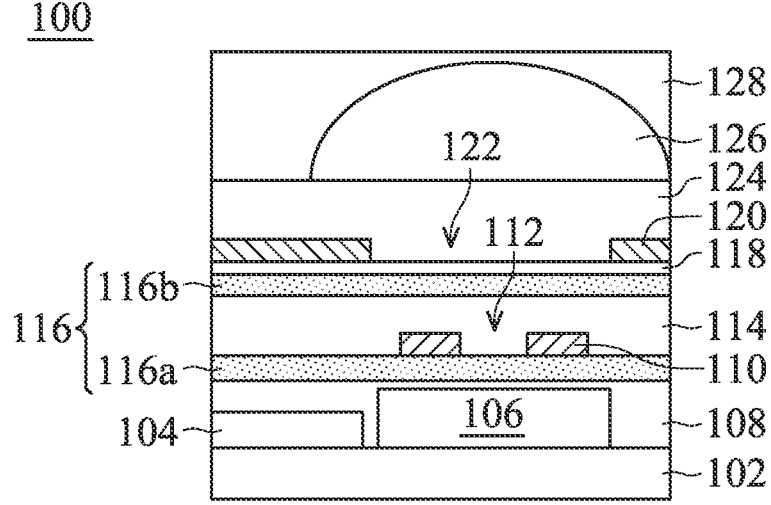
FIG. 7B is a schematic cross-sectional view of an optical sensing device in accordance with one embodiment of the present disclosure.

Referring to FIG. 7B, in accordance with one embodiment of the present disclosure, an optical sensing device 100 is provided. FIG. 7B is a schematic cross-sectional view of the optical sensing device 100.

In the embodiment shown in FIG. 7B, the structures and materials of each component and each layer of the optical sensing device 100 are similar to those of the embodiment shown in FIG. 7A (except for the configuration of the first filter 116a and the second filter 116b), and will not be repeated here. The following will describe the relative positional relationship between the components and the configuration of the filter 116. As shown in FIG. 7B, the thin-film transistor 104 is disposed on the substrate 102. The sensing unit 106 is disposed on the substrate 102 and driven by the thin-film transistor 104. The first insulating layer 108 is disposed on the substrate 102 and covers the thin-film transistor 104 and the sensing unit 106. The first filter 116a is disposed on the first insulating layer 108. The first light-shielding layer 110 is disposed on the first filter 116a. The first pinhole 112 is formed in the first light-shielding layer 110. The second insulating layer 114 is disposed on the first filter 116a, covers the first light-shielding layer 110, and fills the first pinhole 112. The second filter 116b is disposed on the second insulating layer 114. The first filter 116a and the second filter 116b (i.e., multiple organic material layers) constitute the filter 116, but the present disclosure is not limited thereto. The light-filtering wavelength bands and effects of the first filter 116a and the second filter 116b are similar to the embodiment shown in FIG. 7A, and will not be repeated here. The third insulating layer 118 is disposed on the second filter 116b. The second light-shielding layer 120 is disposed on the third insulating layer 118. The second pinhole 122 is formed in the second light-shielding layer 120. The fourth insulating layer 124 is disposed on the third insulating layer 118 to cover the second light-shielding layer 120 and fills the second pinhole 122. The light-focusing means 126 is disposed on the fourth insulating layer 124. In FIG. 7B, the light-focusing means 126 used is a microlens, but the present disclosure is not limited thereto. The fifth insulating layer 128 is disposed on the fourth insulating layer 124, covers the light-focusing means 126, and can be used as a protective layer of the light-focusing means 126. It is worth noting that, in the embodiment shown in FIG. 7B, the projection of the filter 116 on the substrate 102 and the projection of the sensing unit 106 on the substrate 102 overlap, and the first filter 116a and the second filter 116b are not in substantial contact with each other. For example, the first filter 116a is disposed under the first light-shielding layer 110, and the second filter 116b is disposed between the first light-shielding layer 110 and the second light-shielding layer 120, but the present disclosure is not limited thereto.

Figure 8:
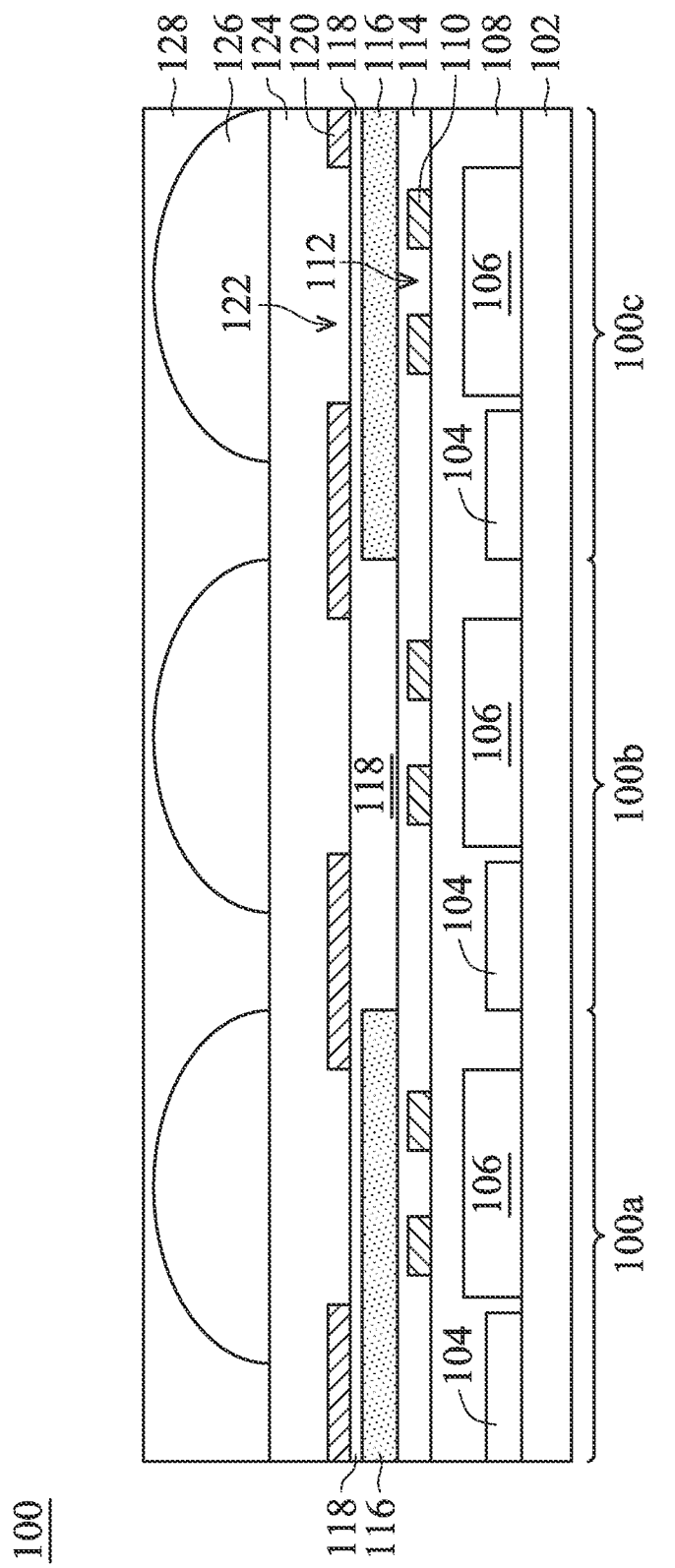
FIG. 8 is a schematic cross-sectional view of an optical sensing device in accordance with one embodiment of the present disclosure.

Referring to FIG. 8, in accordance with one embodiment of the present disclosure, an optical sensing device 100 is provided. FIG. 8 is a schematic cross-sectional view of the optical sensing device 100.

In the embodiment shown in FIG. 8, three adjacent pixels in the optical sensing device 100 are taken as an example for illustration. As shown in FIG. 8, the optical sensing device 100 includes a first pixel 100a, a second pixel 100b, and a third pixel 100c. The second pixel 100b is located between the first pixel 100a and the third pixel 100c. It is worth noting that a row selection line (not shown) can be disposed between the first pixel 100a and the second pixel 100b to be electrically connected to the second pixel 100b or the first pixel 100a. For example, reading the voltage value of the thin-film transistor 104 in the second pixel 100b or the first pixel 100a through the row selection circuit, but the present disclosure is not limited thereto. Similarly, another row selection line (not shown) can be disposed between the second pixel 100*b* and the third pixel 100*c*, which is electrically connected to the second pixel 100*b* or the third pixel 100*c*. The structures and materials of the components and layers in the first pixel 100*a*, the second pixel 100*b*, and the third pixel 100*c* are similar to the embodiment shown in FIG. 2 (except for the configuration of the filter 116), and will not be repeated here. The following will describe the relative positional relationship between the components and the configuration of the filter 116. As shown in FIG. 8, in the first pixel 100*a*, the filter 116 is disposed between the first light-shielding layer 110 and the second light-shielding layer 120. In the second pixel 100*b*, the filter 116 is not provided, and at least part of the sensing unit 106 is exposed for detecting infrared (IR) light and/or near-infrared (NIR) light signals. In the third pixel 100*c*, the filter 116 is disposed between the first light-shielding layer 110 and the second light-shielding layer 120. In some embodiments, the position and number of the filter 116 in the first pixel 100*a* and the third pixel 100*c* can also be adjusted to the embodiments shown in FIGS. 4, 5, 6, 7, and 8.

Figure 9A:
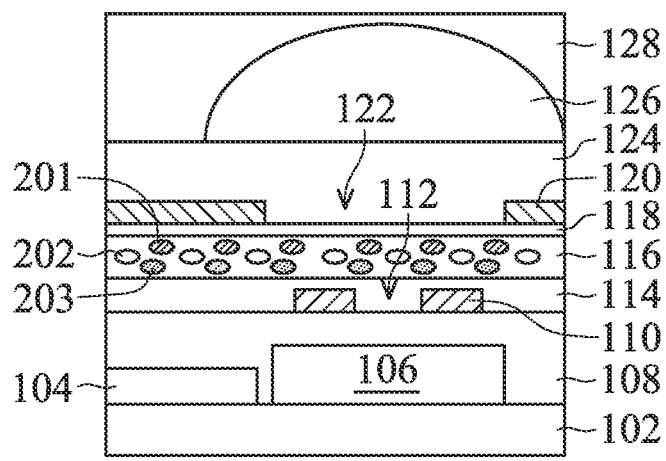
FIG. 9A is a schematic cross-sectional view of an optical sensing device in accordance with one embodiment of the present disclosure.

Referring to FIG. 9A, in accordance with one embodiment of the present disclosure, an optical sensing device 100 is provided. FIG. 9A is a schematic cross-sectional view of the optical sensing device 100.

In the embodiment shown in FIG. 9A, the structures and materials of each component and each layer of the optical sensing device 100 are similar to those of the embodiment shown in FIG. 2 (except for the composition of the filter 116), and will not be repeated here. The following will describe the relative positional relationship between the components and the composition of the filter 116. As shown in FIG. 9A, the filter 116 is disposed between the first light-shielding layer 110 and the second light-shielding layer 120, and the filter 116 includes a variety of dyes, for example, 201, 202, and 203. Since each dye can absorb or reflect light with a certain wavelength band, the filter 116 mixed with multiple dyes has a light-filtering addition effect. The total wavelength range of filtering near-infrared light can be between about 700 nanometers to about 1,100 nanometers.

Figure 9B:
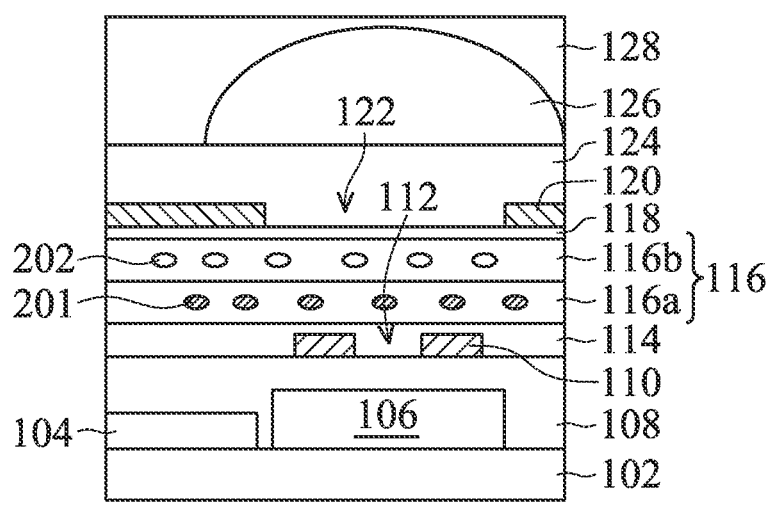
FIG. 9B is a schematic cross-sectional view of an optical sensing device in accordance with one embodiment of the present disclosure.

Referring to FIG. 9B, in accordance with one embodiment of the present disclosure, an optical sensing device 100 is provided. FIG. 9B is a schematic cross-sectional view of the optical sensing device 100.

In the embodiment shown in FIG. 9B, the structures and materials of each component and each layer of the optical sensing device 100 are similar to those of the embodiment shown in FIG. 9A (except for the configuration and composition of the filter 116), and will not be repeated here. The following will describe the relative positional relationship between the components, and the configuration and composition of the filter 116. As shown in FIG. 9B, the filter 116 includes a first filter 116*a* and a second filter 116*b*, and is disposed between the first light-shielding layer 110 and the second light-shielding layer 120. The first filter 116*a* includes a dye 201. The second filter 116*b* includes a dye 202. The dye 201 and the dye 202 absorb or reflect light with different specific wavelength bands, respectively. In some embodiments, the first filter 116*a* and the second filter 116*b* may also contain multiple dyes respectively. Since the filter 116 is a combination of multiple organic material layers (the first filter 116*a* and the second filter 116*b*), each layer of the filter only needs to be filled with a single dye or pigment to achieve the effect of light-filtering addition. In addition to effectively reducing costs, it can also provide the options of multiple light-filtering wavelength bands.

Figure 10:
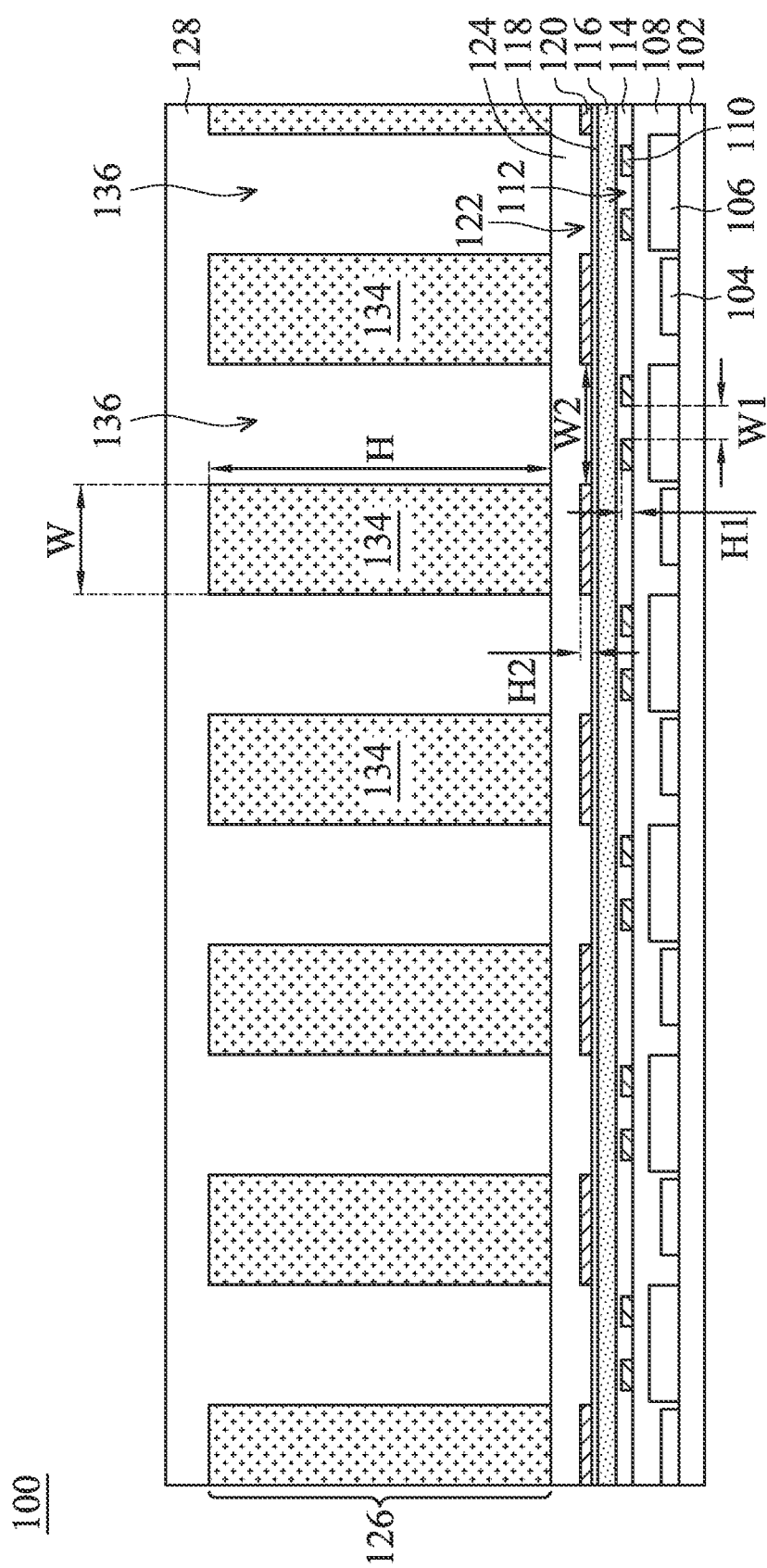
FIG. 10 is a schematic cross-sectional view of an optical sensing device in accordance with one embodiment of the present disclosure.

Referring to FIG. 10, in accordance with one embodiment of the present disclosure, an optical sensing device 100 is provided. FIG. 10 is a schematic cross-sectional view of the optical sensing device 100.

In the embodiment shown in FIG. 10, a plurality of adjacent pixels in the optical sensing device 100 are taken as an example for description. A row selection line (not shown) can be set between adjacent pixels to be electrically connected to each pixel. For example, the row selection line can be used to read the voltage value of the thin-film transistor 104 in each pixel, but the present disclosure is not limited thereto. The structure and materials of each component and each layer in the pixel are similar to the embodiment shown in FIG. 2 (except for the configuration of the light-focusing means 126), and will not be repeated here. The following will describe the relative positional relationship between the components and the configuration of the light-focusing means 126. As shown in FIG. 10, the light-focusing means 126 is disposed on the fourth insulating layer 124. The light-focusing means 126 used here is a collimator structure, for example, composed of a plurality of columnar structures 134 and pinholes 136, but the present disclosure is not limited thereto. It is worth noting that, referring to FIG. 10, the aspect ratio (H/W) of the columnar structure 134 is greater than the aspect ratio (H2/W2) of the second pinhole 122 and the aspect ratio (H1/W1) of the first pinhole 112. The fifth insulating layer 128 is disposed on the fourth insulating layer 124, covers the columnar structures 134, and fills the pinholes 136, which can be used as a protective layer for the light-focusing means 126. The pinhole 136 of the light-focusing means 126 corresponds to the second pinhole 122, the first pinhole 112, and the sensing unit 106, so that the light to be detected focused by the light-focusing means 126 continues to pass through the second pinhole 122 and the first pinhole 112, and is focused on the sensing unit 106.

Figure 11:
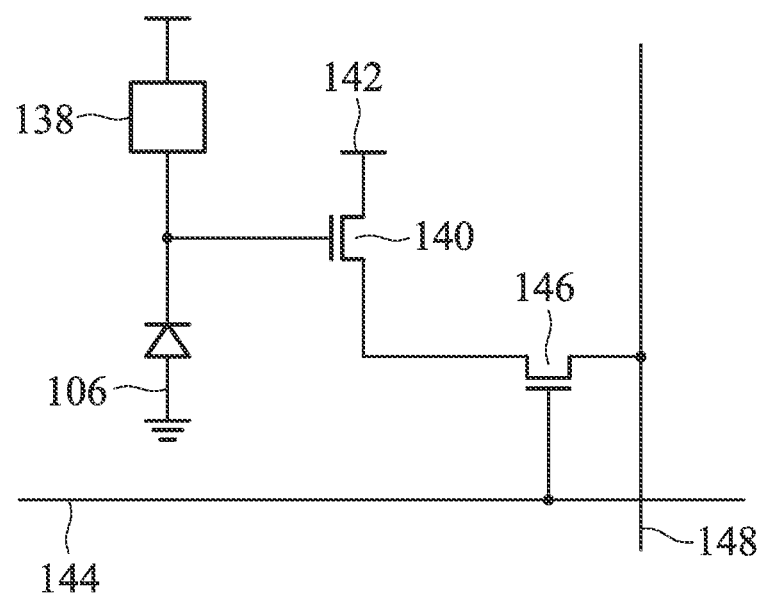
FIG. 11 is a circuit diagram of an optical sensing device in accordance with one embodiment of the present disclosure.

Referring to FIG. 11, in accordance with one embodiment of the present disclosure, a circuit diagram of an optical sensing device 100 is provided.

FIG. 11 discloses the circuit connection and operating relationship between the thin-film transistor 104 and the sensing unit 106 in the optical sensing device 100. A reset circuit 138 is turned off after the circuit is reset. After the sensing unit 106 collects the light, it converts the optical signal into an electrical signal. When the electrical signal is large enough, a first thin-film transistor 140 is turned on, so that an external voltage 142 is introduced. At this time, a column selection line 144 provides a voltage to turn on a second thin-film transistor 146, and the voltage value of the second thin-film transistor 146 is read through a row selection line 148. According to the read voltage value of the second thin-film transistor 146, and with reference to the voltage value of the sensing unit 106, the received light intensity of the sensing unit 106 is determined. The reset circuit 138 can be composed of a single transistor, or a circuit composed of multiple transistors, capacitors, or resistors.

Figure 12:
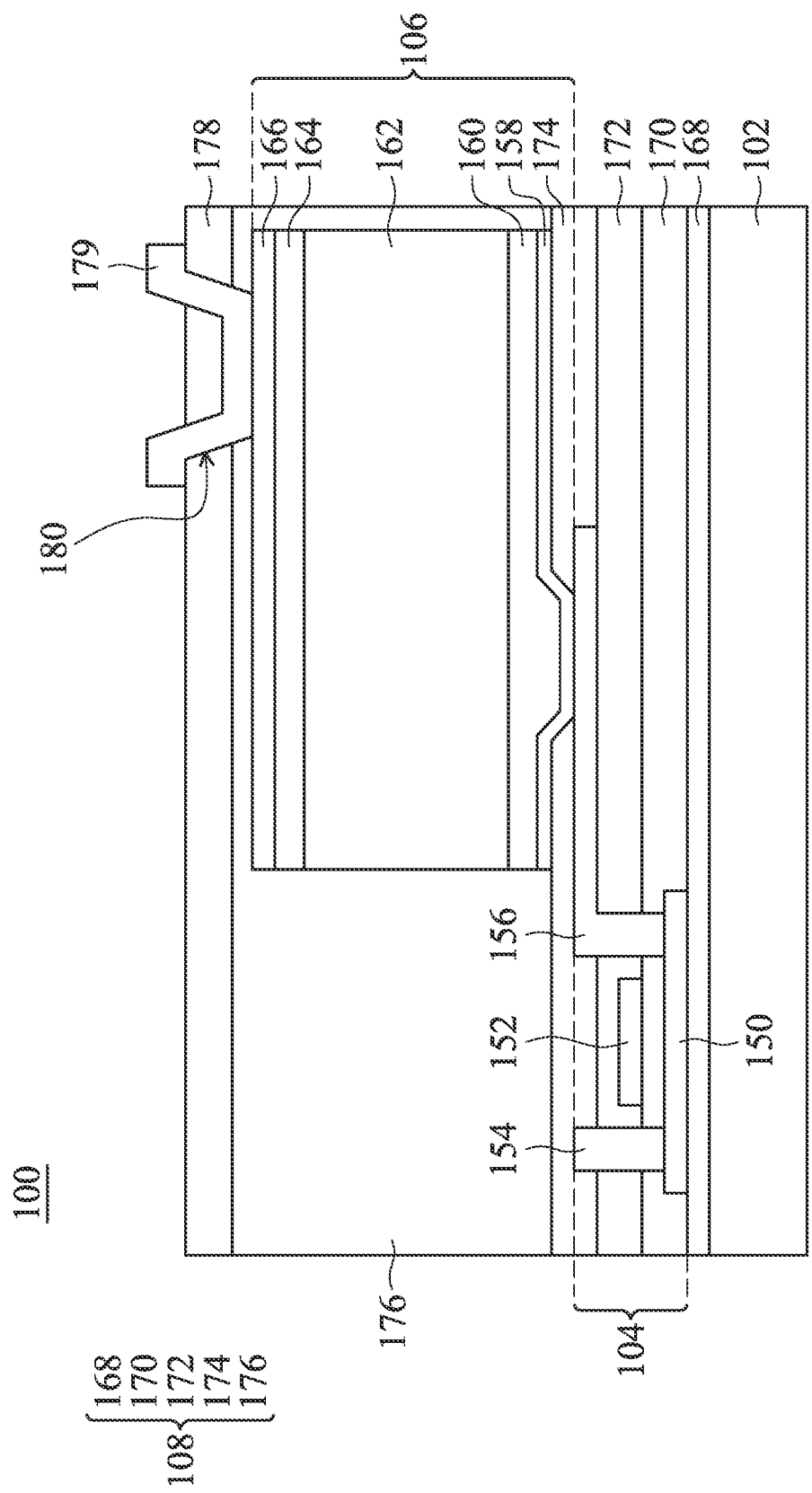
FIG. 12 is a schematic cross-sectional view of an optical sensing device in accordance with one embodiment of the present disclosure.

Referring to FIG. 12, in accordance with one embodiment of the present disclosure, an optical sensing device 100 is provided. FIG. 12 is a schematic cross-sectional view of the optical sensing device 100.

The difference between the embodiment shown in FIG. 12 and the embodiment shown in FIG. 2 mainly lies in the relative positional relationship between the thin-film transistor 104 and the sensing unit 106. In FIG. 12, the sensing unit 106 is disposed on the thin-film transistor 104, but the present disclosure is not limited thereto. Other relative positional relationships between the thin-film transistor 104 and the sensing unit 106 are also applicable to the present disclosure. As shown in FIG. 12, the optical sensing device 100 includes a substrate 102, a thin-film transistor (TFT) 104, a sensing unit 106, and a first insulating layer 108. The substrate 102 may include any suitable hard or soft substrate material. The thin-film transistor 104 includes an active layer 150, a gate electrode 152, a source electrode 154, and a drain electrode 156. The thin-film transistor 104 is disposed on the substrate 102 and located in the first insulating layer 108. The sensing unit 106 includes a bottom electrode 158, an N-type semiconductor layer 160, an intrinsic semiconductor layer 162, a P-type semiconductor layer 164, and a top electrode 166. The sensing unit 106 is disposed on the substrate 102, is located in the first insulating layer 108, is not in contact with the substrate 102, and is driven by the thin-film transistor 104. The sensing unit 106 may include a light-to-electricity photosensitive element, for example, a silicon-based photodiode. The sensing unit 106 may include an inorganic PIN photodiode or an organic photodiode (OPD). The first insulating layer 108 includes a composite layer composed of a first dielectric layer 168, a second dielectric layer 170, a third dielectric layer 172, a fourth dielectric layer 174, and a fifth dielectric layer 176, but the present disclosure is not limited thereto. In FIG. 12, the first dielectric layer 168 may be a buffer layer. The second dielectric layer 170 may be a gate insulating layer. The third dielectric layer 172 may be an interlayer dielectric layer. The fourth dielectric layer 174 may be a passivation layer. The fifth dielectric layer 176 may be a planar layer, but the present disclosure is not limited thereto. The function and number of layers of the first insulating layer 108 can be designed according to product requirements. In FIG. 12, a direct electrical connection is formed between the thin-film transistor 104 and the sensing unit 106. For example, the thin-film transistor 104 is directly connected to the bottom electrode 158 of the sensing unit 106 through the drain electrode 156. In some embodiments, an indirect electrical connection may be formed between the thin-film transistor 104 and the sensing unit 106. In some embodiments, an inorganic dielectric layer 178 may be selectively provided on the fifth dielectric layer 176 of the first insulating layer 108, as shown in FIG. 12. According to some embodiments, a conductive structure 179 may be selectively designed. The conductive structure 179 may be disposed on the top electrode 166 and electrically connected to the top electrode 166. In another embodiment, the conductive structure 179 may be electrically connected to the top electrode 166 through the through holes 180 of the inorganic dielectric layer 178 and the fifth dielectric layer 176.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An optical sensing device, comprising:
a thin-film transistor disposed on a substrate;
a sensing unit driven by the thin-film transistor and disposed on the substrate;
a filter,
wherein a light to be detected passes through the filter before being collected by the sensing unit, and the filter reduces the light intensity of the light to be detected in near-infrared wavelength band;
a light focusing means through which the light to be detected passes prior to being filtered;
a pinhole through which the light to be detected focused by the light focusing means passes prior to being filtered; and
a second pinhole located between the light focusing means and the pinhole, wherein the second pinhole is larger than the pinhole.

2. The optical sensing device as claimed in claim 1, wherein the filter is made of an organic material.

3. The optical sensing device as claimed in claim 1, further comprising a pinhole, wherein the filter is disposed between the light focusing means and the pinhole.

4. The optical sensing device as claimed in claim 3, further comprising a second pinhole located between the light focusing means and the filter, wherein the second pinhole is larger than the pinhole.

5. The optical sensing device as claimed in claim 3, further comprising a second pinhole located between the filter and the pinhole, wherein the second pinhole is larger than the pinhole.

6. The optical sensing device as claimed in claim 3, further comprising a second pinhole located between the light focusing means and the filter, wherein the filter is filled into the pinhole, and the second pinhole is larger than the pinhole.

7. The optical sensing device as claimed in claim 3, further comprising a second pinhole located between the light focusing means and the filter, wherein the second pinhole is larger than the pinhole, and positions of the pinhole, the filter, the second pinhole, and the light-focusing means are offset by different specific distances relative to a position of the sensing unit.

8. The optical sensing device as claimed in claim 3, further comprising a second pinhole located above the light-focusing means, wherein the second pinhole is larger than the pinhole.

9. The optical sensing device as claimed in claim 4, further comprising a second filter disposed between the second pinhole and the filter.

10. The optical sensing device as claimed in claim 4, further comprising a second filter disposed between the pinhole and the sensing unit.

11. The optical sensing device as claimed in claim 4, wherein the filter is mixed with multiple dyes, and a total wavelength range of filtering light is between 700 nanometers to 1,100 nanometers.

12. The optical sensing device as claimed in claim 9, wherein the filter comprises a first dye, the second filter comprises a second dye, and the first dye and the second dye absorb or reflect light with different specific wavelength bands, respectively.

13. The optical sensing device as claimed in claim 1, wherein the light-focusing means comprises a microlens.

14. The optical sensing device as claimed in claim 4, wherein the light-focusing means comprises a collimator structure, and an aspect ratio of the columnar structure is greater than an aspect ratio of the second pinhole and an aspect ratio of the pinhole.

15. The optical sensing device as claimed in claim 1, wherein the thin-film transistor is connected to the sensing unit through a drain electrode.

16. The optical sensing device as claimed in claim 1, wherein the sensing unit is a silicon-based photodiode.

17. The optical sensing device as claimed in claim 1, wherein the sensing unit is an organic photodiode.

\* \* \* \* \*